TIME →

INVENTOR
F. H. TENDICK, JR.
BY Lucian C. Canepa
ATTORNEY

LOGIC CIRCUIT

Filed Oct. 21, 1960 2 Sheets-Sheet 2

INVENTOR
F. H. TENDICK, JR.
BY Lucian C. Canepa
ATTORNEY

United States Patent Office 3,054,002

Patented Sept. 11, 1962

3,054,002
LOGIC CIRCUIT

Frank H. Tendick, Jr., Summit, N.J., assignor to Bell Telephone Laboratories, Incorporated, New York, N.Y., a corporation of New York Filed Oct. 21, 1960, Ser. No. 64,173
12 Claims. (Cl. 307—88.5)

This invention relates to signal translating circuits, and more particularly to logic circuits employing negative resistance diodes.

As the complexity of modern day digital information processing systems has increased, it has become increasingly important that the logic circuits thereof be highly reliable, extremely fast, and, for obvious reasons of economy in design, maintenance and repair, that the number of different circuit configurations needed to construct such systems be held to a minimum.

An object of the present invention is the improvement of signal translating circuits.

More specifically, an object of this invention is the provision of a basic building block logic circuit which is characterized by high speed, low power dissipation, high reliability, and simplicity of design.

These and other objects of the present invention are realized in a specific illustrative embodiment thereof which comprises a circuit including a negative resistance diode of the voltage-controlled type to each of whose electrodes are connected an asymmetrically-conducting diode and a clock source. Additionally, a third clock source and an input signal source are connected to one electrode of the negative resistance diode, which electrode is hereinafter referred to as the input electrode of the negative resistance diode. At the other or output electrode of the negative resistance diode appear signals which are related in a logical way to the input signals applied to the circuit.

The outputs of the clock sources of the illustrative circuit are so arranged that during a first time interval of a cycle of operation the output electrode of the voltage-controlled negative resistance diode is clamped at approximately ground potential by one of the asymmetrically-conducting diodes. Also, during the first time interval, the negative resistance diode is biased in its relatively low voltage stable state for bistable operation, and the third clock source then switches or does not switch the negative resistance diode to its relatively high voltage stable state depending respectively on whether the output of the input source is a relatively low voltage "0" signal or a relatively high voltage "1" signal. More specifically, if the input source supplies a "0" signal to the illustrative logic circuit, the third clock source switches the diode to its relatively high voltage stable state which is representative of a "1" signal. Conversely, if the input source supplies a "1" signal to the circuit, the third clock source is then not effective to switch the diode, which, as a result, remains in its relatively low voltage or "0" state.

During a second time interval of the cycle of operation of the illustrative logic circuit, the input terminal of the voltage-controlled negative resistance diode is clamped at approximately ground potential by the other one of the asymmetrically-conducting diodes. The signal which then appears at the output terminal of the negative resistance diode with respect to ground is either a relatively low voltage "0" signal, if the diode was not switched to its high voltage state during the first interval, or, in the event that the diode was switched to its high voltage state during the first interval, a relatively high voltage "1" signal.

Thus, the described circuit performs the function of inversion, converting an input "0" signal to an output "1" signal or an input "1" signal to an output "0" signal.

Moreover, by omitting the third clock source and connecting a plurality of signal sources to each of the input and output electrodes of the negative resistance diode, the described circuit may be modified to form any one of a variety of logic circuits which in combination with the aforedescribed inverter circuit are capable of providing all of the basic logical functions required in a digital data processing system.

In one such illustrative modified circuit, in which two-stage logical operations are performed, each of the input and output electrodes of the negative resistance diode has two signal sources coupled thereto. During the first time interval of the cycle of operation of the illustrative modified circuit, the negative resistance diode is switched to its relatively high voltage or "1" state only if each of the two signal sources connected to the input electrode thereof supplies a "1" signal. During the second time interval, the voltage appearing at the output electrode of the negative resistance diode is a relatively high voltage "1" signal if the diode was switched to its relatively high voltage state during the first time interval or if the diode is so switched by the signal sources connected to the output electrode thereof, which latter sources may, for example, be so arranged that only concurrent "1" signals therefrom are effective to switch the negative resistance diode. In Boolean algebra terms the output signal $x$ of such a modified circuit is related to the input signals $i_1$ and $i_2$ coupled to the input electrode of the negative resistance diode and to the input signals $i_3$ and $i_4$ coupled to the output electrode thereof by the expression $x=i_1i_2+i_3i_4$. In other terms, the output of the circuit is a "1" signal if $i_1$ and $i_2$ are both "1" signals, or if $i_3$ and $i_4$ are both "1" signals.

In summary, a logic circuit made in accordance with the principles of the present invention includes a plurality of clock sources, two asymmetrically-conducting diodes, and a single voltage-controlled negative resistance diode, interconnected in an arrangement which is capable of performing inversion or two-stage logical operations.

It is a feature of the present invention that a logic circuit include a voltage-controlled negative resistance diode whose electrodes are respectively connected to two asymmetrically-conducting diodes.

It is another feature of this invention that a logic circuit include a voltage-controlled negative resistance diode, two asymmetrically-conducting diodes respectively connected to the electrodes of the negative resistance diode, and clock source circuitry for causing one of the negative resistance diode electrodes to be clamped by one of the asymmetrically-conducting diodes at a relatively low voltage during a first time interval and for biasing the negative resistance diode at a relatively low voltage stable operating point for bistable operation during the first time interval, the clock source circuitry causing the other one of the negative resistance diode electrodes to be clamped by the other asymmetrically-conducting diode at a relatively low voltage during the second time interval and biasing the negative resistance diode for bistable operation during the second time interval.

A complete understanding of the present invention and of the above and other features and advantages thereof may be gained from a consideration of the following detailed description of illustrative embodiments thereof presented hereinbelow in connection with the accompanying drawing, in which.

Figure 1A:
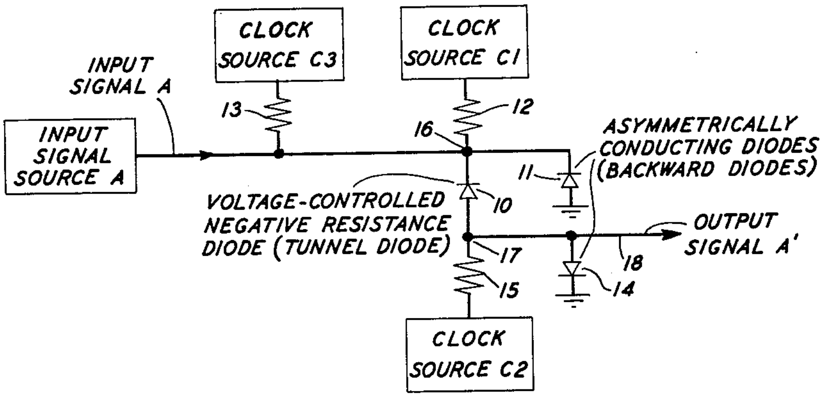
FIG. 1A is a schematic showing of a specific illustrative logic circuit embodying the principles of the present invention.

A great variety of electronic devices and circuits exhibit negative resistance characteristics and it has long been known that such negative resistance characteristics may have one of two forms. The N-type negative resistance, which is referred to as open-circuit stable (or short-circuit unstable, or voltage-controlled), is characterized by zero-conductance turning points. The S-type negative resistance, which is referred to as short-circuit stable (or open-circuit unstable, or current-controlled), is the dual of the N-type and is characterized by zero-resistance turning points. The thyratron and dynatron are vacuum tube examples of devices which respectively exhibit S- and N-type negative resistance characteristics.

Illustrative embodiments of the principles of the present invention include negative resistance diodes of the voltage-controlled type. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, volume 109, January-March 1958, pages 603–604; "Tunnel Diodes as High-Frequency Devices," H. S. Sommers, Jr., Proceedings of the Institute of Radio Engineers, volume 47, July 1959, pages 1201–1206; and "High-Frequency Negative-Resistance Circuit Principles for Esaki Diode Applications," M. E. Hines, The Bell System Technical Journal, volume 39, May 1960, pages 477–513.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction; that it be narrow (the chemical transition from n-type to p-type region must be abrupt), of the order of 100 Angstrom units in thickness, and that both regions be degenerate (i.e., contained very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

A well-known variant of the tunnel diode is the so-called backward diode, which exhibits well defined high and low impedance regions under conditions of forward and reverse bias, respectively. Accordingly, the backward diode may be connected backwards (with respect to the manner of connection of a conventional asymmetrically-conducting diode) to perform conventional diode circuit functions at voltage and current levels compatible with tunnel diodes. Advantageously, then, whenever the voltage-controlled negative resistance diode included in an illustrative embodiment of the principles of the present invention is a tunnel diode, the asymmetrically-conducting diodes in combination therewith are backward diodes.

Backward diodes are, for example, described in "Tunnel Diode Operation and Application," I. A. Lesk et al., pages 270–277, Electrical Engineering, April 1960, and in G. L. Pearson Patent 2,952,824, issued September 13 1960.

Referring now to FIG. 1A, there is shown a logic circuit comprising a tunnel diode 10 whose cathode or input electrode is connected to the cathode electrode of a backward diode 11, the plate electrode of which diode 11 is connected to ground. Also, the input electrode of the diode 10 is connected through a resistor 12 to a clock source C1, through a resistor 13 to a clock source C3, and to an input signal source A.

Connected to the plate or output electrode of the tunnel diode 10 is the plate electrode of a backward diode 14, the cathode electrode of which diode 14 is connected to ground. Also, the output electrode of the diode 10 is connected through a resistor 15 to a clock source C2.

The illustrative circuit shown in FIG. 1A performs the function of inversion. The principles of operation of the circuit may be fully comprehended with the aid of the timing diagram of FIG. 1B and the curves of FIG. 1C. In FIG. 1C, the solid curve 20 is a graphical depiction of the relationship between the current through and the voltage across the tunnel diode 10 of FIG. 1A. The portion of the curve 20 in the first quadrant of FIG. 1C includes a relatively low voltage positive resistance region I, a negative resistance region II, and a relatively high voltage positive resistance region III. Illustratively, the absolute resistance values for the regions I, II, and III of the diode of FIG. 1A are 5 ohms, 25 ohms, and 5 ohms, respectively. Further, typical voltage and current values corresponding to the peak point 21 of the curve 20 are about 50 millivolts and 10 milliamperes, respectively; and typical voltage and current values corresponding to the valley point 22 are about 350 millivolts and 1 milliampere, respectively.

The third quadrant or reverse current portion of the voltage-current characteristic curve 20 of FIG. 1C includes therein another positive resistance region IV, whose resistance value is typically approximately the same as the value of the forward resistance of the regions I and III. In other words, the back or reverse resistance of the diode 10 of FIG. 1A is about the same as the forward resistance thereof. Accordingly, unlike conventional asymmetrically-conducting diodes which have a high front-to-back resistance ratio, such a diode presents a relatively low resistance to current flow in the reverse direction.

FIG. 1C also includes the characteristic curve of each of the backward diodes 11 and 14 shown in FIG. 1A. The curve therefor includes a dashed line portion 23 and, additionally, portions which are coincident with the portions III and IV of the curve 20. The curve including the portion 23 is representative of a low reverse resistance and a high forward resistance, the high forward resistance persisting until the applied forward bias reaches a voltage whose value approximates that which corresponds to the valley point 22 of the curve 20.

Figure 1B:
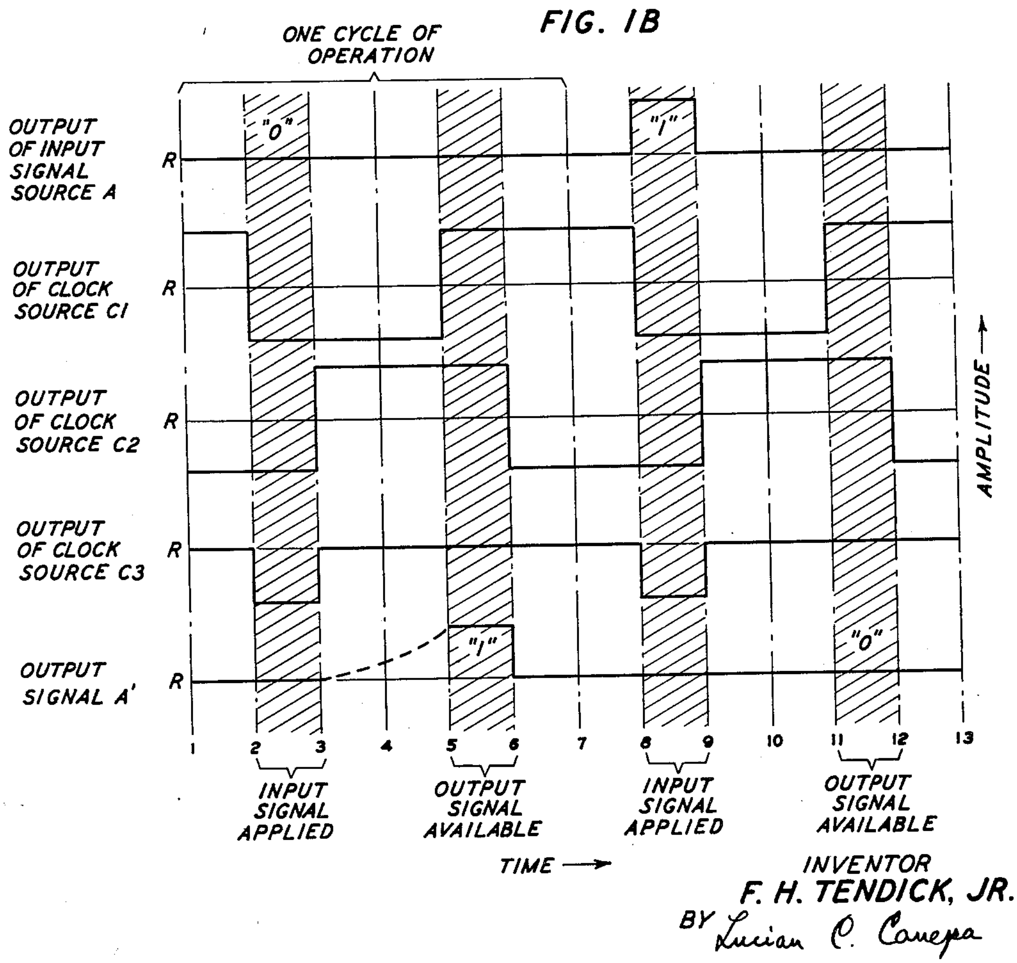
FIG. 1B is a timing diagram for the circuit shown in FIG. 1A.
Figures 1C, 2:
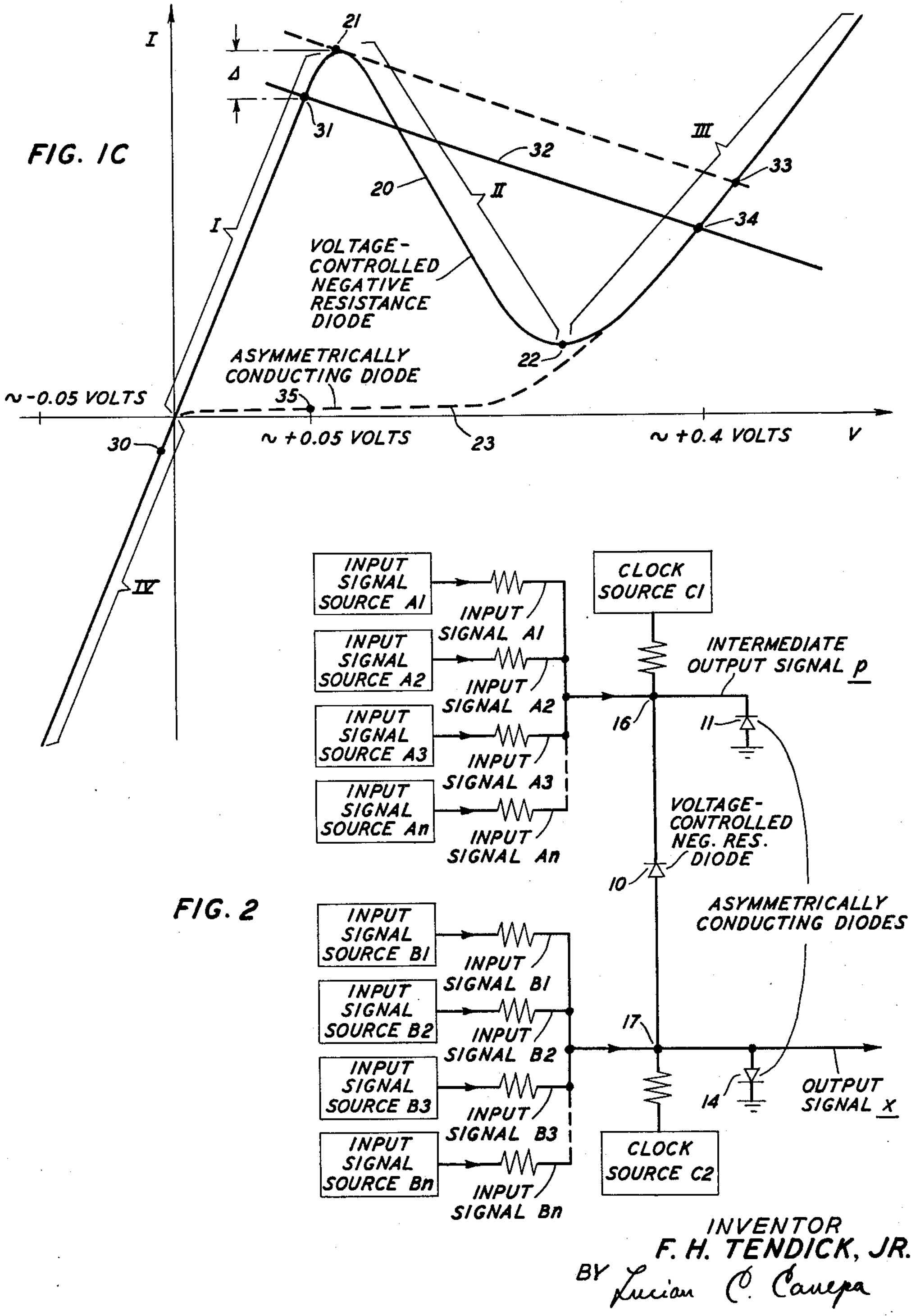
FIG. 1C illustrates the voltage-current characteristic curve of the negative resistance diode depicted in FIGS. 1A and 2 and, also, on the same set of axes. illustrates the voltage-current characteristic curve of each of the asymmetrically-conducting diodes shown in FIGS. 1A and 2.
FIG. 2 is a schematic showing of another illustrative embodiment of the principles of the present invention.

Initially, i.e., during the time period designated 1 through 2 on the time axis of FIG. 1B, the output of the clock source C1 is a positive voltage level, the output of the clock source C2 is a negative voltage level, and the output of the clock source C3 is a reference level R. (Note that all the voltage levels indicated on FIG. 1B are referenced with respect to the level R whose value is approximately ground potential, the difference therefrom being the relatively small voltage drop which appears across a reverse-biased backward diode.) Consequently, during the time period 1 through 2, the backward diode 11 is biased in its low impedance state (point 30), wherein the voltage of its cathode with respect to its plate is a small positive voltage, thereby making the potential of the input node point 16 slightly positive with respect to ground. Also, during the period 1 through 2, the backward diode 14 is biased in its low impedance state, wherein the voltage of its plate with respect to its cathode is a small negative voltage, thereby making the potential of the output node point 17 slightly negative with respect to ground. As a result, the voltage appearing across the tunnel diode 10 during the period 1 through 2 is of a value to cause a small reverse current to flow therethrough, as represented by the operating point 30 on the characteristic curve 20 shown in FIG. 1C.

Subsequently, during the time period designated 2 through 3 in FIG. 1B, the output of the clock source C2 remains at the aforementioned negative value, thereby maintaining the backward diode 14 in a low impedance condition and the output node point 17 at approximately ground potential. On the other hand, the output of the clock source C1 of FIG. 1A switches, at time 2, to a negative voltage level. In so doing, the source C1 causes the operating point of the backward diode 11 to shift from the point 30 to a relatively high impedance operating point 35, and causes the operating point of the tunnel diode 10 to shift from the point 30 to a relatively low voltage stable operating point 31, thereby biasing the diode 10 for bistable operation. Note that the operating point 31 is one of two stable points defined by the intersection of load line 32 with the characteristic curve 20.

During the time interval 2 through 3, the output of the input signal source A is depicted in FIG. 1B as being a relatively low voltage level, representative of a "0" signal, and the output of the clock source C3 then assumes a value which is sufficiently negative with respect to the level R to cause an increment $\Delta$ of current to flow through the diode 10. As indicated in FIG. 1C, the increment $\Delta$ causes the operating point of the diode to switch from the point 31 over the peak point 21 of the curve 20 and to a point 33 on the relatively high voltage positive resistance region III, which action causes the operating point of the backward diode 11 to shift from the point 35 to the point 33. Subsequently, when the output level of the clock source C3 returns to the level R, the operating points of the diode 10 and the backward diode 11 shift from the point 33 to the relatively high voltage operating point 34.

At time 3, the output of the clock source C3 returns to the reference level R. Also, at time 3, the output of the clock source C2 switches to a positive voltage level, which biases the backward diode 14 in its high impedance state, thereby ungrounding the output node point 17. Additionally, at time 3, the clock source C2 in combination with the clock source C1 supplies a forward bias current through the tunnel diode 10 to maintain it in its relatively high voltage stable condition to which it was switched during the time period 2 through 3.

During the time period 3 through 5, the outputs of the sources C1, C2, and C3 are as shown in FIG. 1B. The signal which appears on output lead 18 during the period 3 through 5 is not generally determinable, for the node points 16 and 17 are during that time floating, and, hence, not exactly specifiable. Accordingly, to indicate in FIG. 1B the indeterminate nature of the output voltage during the period 3 through 5, the voltage level of the output signal is represented in the period 3 through 5 by a dashed line.

At time 5, the output of the clock source C1 assumes a positive level, which biases the backward diode 11 connected to the input node point 16 in its low impedance condition (at point 30), thereby clamping the point 16 at approximately ground potential, and, since at time 5 the tunnel diode 10 is still in its relatively high voltage state, the voltage appearing on the output lead 18 at time 5 assumes a relatively high voltage level representative of a "1" signal.

Then, at time 6, the output of the clock source C2 assumes a negative voltage level, which causes the diode 10 to be switched past the valley point 22 to the relatively low voltage positive resistance region of the characteristic curve 20 of FIG. 1C. Also, at time 6, both of the node points 16 and 17 are clamped at approximately ground potential by the backward diodes 11 and 14, respectively. Finally, at time 7, another complete cycle of operation commences. In the second cycle of operation, which extends over the time period marked 7 through 13 in FIG. 1B, a relatively high voltage of "1" signal is shown as being applied to the circuit during the time period 8 through 9 and an inverted version thereof, viz., a "0" signal, as appearing on the output lead 18 during the time period 11 through 12.

The cycle of operation described in detail above as extending over the time period 1 through 7 of FIG. 1B may be summarized as follows. During the time interval 2 through 3 the plate electrode of the tunnel diode 10 is clamped at approximately ground potential, the cathode electrode thereof is biased for bistable operation, and an input signal is applied to the cathode electrode of the diode 10. Then, during a subsequent time interval, viz., the interval 5 through 6, the cathode electrode of the diode 10 is clamped at approximately ground potential, the plate electrode thereof is biased for bistable operation, and an inverted version of the input signal appears on the output lead 18 of the circuit.

The inverter circuit depicted in FIG. 1A may be modified to a form in which the condition of the tunnel diode 10 during the first time interval 2 through 3 is determined by a plurality of input signal sources rather than by the clock or switching signal source C3 and the single input or inhibiting signal source A. Additionally, the circuit of FIG. 1A may be modified to include a plurality of input signal sources connected to the output node point 17 thereof, whereby the condition of the tunnel diode 10 is determined during the first time interval by the signal sources connected to the input node point 16, or, in the event that the diode 10 was not switched to its high voltage state during the first time interval, the condition thereof is determined during the second time interval by the signal sources connected to the output node point 17. Such a modified circuit arrangement is shown in FIG. 2.

The circuit of FIG. 2 may be arranged to perform a variety of logical operations. Illustratively, the input signal sources of FIG. 2 may be selected so that a switching signal is supplied therefrom to the tunnel diode of the circuit only if all of the sources supply "1" signals to the diode 10. In Boolean algebra terms, the relationship between the output signal $x$ and the input signals to the circuit of FIG. 2 may, for such an illustrative case, be represented by the two-stage AND-OR function expression $x=A1A2A3 \ldots An+B1B2B3 \ldots Bn$. Additionally, it is noted that during the first time interval of the cycle of operation of the circuit of FIG. 2, an intermediate output signal $p$ may be derived from the input node point 16 of FIG. 2. Assuming that a relatively high positive or negative voltage level is representative of a "1" signal, the output $p$ is related to the input signals A1 A2 A3 . . . A$n$ by the AND function expression $p=A1A2A3 \ldots An$.

Alternatively, the input signal sources A1 A2 A3 . . . A$n$ of FIG. 2 may be selected so that a switching signal is supplied to the input node point 16 during the first time interval of the cycle of operation of the logic circuit if any one of the sources A1 A2 A3 . . . A*n* supplies a "1" signal thereto. Furthermore, the input signal sources connected to the output node point 17 may also be selected to supply a switching signal to the circuit of any one of the sources B1 B2 B3 . . . B*n* supplies a "1" signal output. In such an illustrative case, the output signal *x* available at the node point 17 during the second time interval of a complete cycle of operation of the circuit of FIG. 2 is related to the input signals coupled to the node points 16 and 17 thereof by the two-stage OR-OR function expression.

$$x=(A1+A2+ \ldots An)+(B1+B2+B3+ \ldots An)$$

Also, in such a case, the intermediate output signal *p* available at the input node point 16 during the first time interval is related to the input signals A1 A2 A3 . . . A*n* by the OR function expression $p=A1+A2+A3 \ldots An$.

Additionally, illustrative embodiments of the principles of the present invention are capable of providing combinations of the logical operations specified above. For example, the input signal sources connected to the node point 16 of FIG. 2 may be selected so that if any one of, or all of, or a majority of the sources supply "1" signals to the point 16, the diode 10 has a switching signal applied thereto. Similarly, the input signal sources connected to the node point 17 may be selected so that "1" signals from any one of, or all of, or a majority of the sources are effective to switch the diode 10 to its high voltage state during the second time interval if the diode was not so switched during the first time interval by the sources connected to the input node point 16.

Illustrative embodiments of the principles of the present invention may be interconnected to form an array which is capable of performing all of the logical operations required in a digital data processing system. In such an array, the clock sources are arranged with respect to each other so that unilateral operation occurs. (Unilateral operation can be defined as operation in which signals can propagate in one direction only.) Such operation can be provided by arranging a three-phase clock source so that only two of the three phases thereof are in the same state at any given time. As a result, a circuit powered by phase *a* will propagate information forward to circuits powered by phase *b*, but will not propagate information backwards to circuits powered by phase *c*.

It is emphasized that, although particular attention herein has been directed to the use of a tunnel diode as the component 10 of the circuits shown in FIGS. 1A and 2, other two-terminal voltage-controlled negative resistance assemblies having characteristics of the type of the curve 20 shown in FIG. 1C may also be used therefor. Additionally, other suitable asymmetrically-conducting devices having characteristics of the general type of that depicted in FIG. 1C may be substituted for the backward diodes 11 and 14 in the circuits of FIGS. 1A and 2.

Furthermore, it is to be understood that the above-described arrangements are only illustrative of the application of the principles of the present invention. Numerous other arrangements may be devised by those skilled in the art without departing from the spirit and scope of the invention. For example, although the clock signals needed for the operation of the circuit of FIG. 1A are indicated as being derived from three separate clock sources, it is, of course, understood that these clock signals may be provided by a single multiphase clock source. Additionally, it is to be understood that the polarity of the diode 10 may be reversed from that shown in FIGS. 1A and 2 provided that the polarities of the diodes 11 and 14 and of the clock source signals are also correspondingly changed.

What is claimed is:

1. In combination in a logic circuit, two-terminal voltage-controlled negative resistance means, first clock source means connected to one terminal of said negative resistance means, first means responsive to said first clock source means for clamping said one terminal at a reference potential during a first time interval, second clock source means connected to the other terminal of said negative resistance means, and second means responsive to said second clock source means for clamping said other terminal at said reference potential during a second time interval, said first and said second clock source means biasing said negative resistance means for bistable operation during said second and first time intervals, respectively.

2. A combination as in claim 1 wherein said negative resistance means is a tunnel diode and each of said first and second clamping means comprises a backward diode.

3. In combination in a logic circuit, two-terminal voltage-controlled negative resistance means, means for clamping the first terminal of said negative resistance means at a reference potential during a first time interval, for biasing said negative resistance means for bistable operation during said first time interval, for clamping the second terminal of said negative resistance means at the reference potential during a second subsequent time interval and for biasing said negative resistance means for bistable operation during said second time interval, and means connected to said negative resistance means for controlling the stable condition thereof during said first and second time intervals.

4. A combination as in claim 3 wherein said controlling means includes a switching signal source and an inhibiting signal source each connected to the second terminal of said negative resistance means.

5. A combination as in claim 3 wherein said controlling means includes at least one switching signal source connected to said first terminal and at least one switching signal source connected to said second terminal.

6. In combination in a logic circuit, two-terminal voltage-controlled negative resistance means, clock means for clamping one terminal of said negative resistance means at a first reference potential during a first time interval and for biasing said negative resistance means for bistable operation during said first time interval, first signal means connected to the other terminal of said negative resistance means for controlling the state thereof during said first time interval, said clock means clamping said other terminal of said negative resistance means at the first reference potential during a second subsequent time interval and biasing said negative resistance means for bistable operation during said second time interval, and second signal means connected to said one terminal for controlling the state of said negative resistance means during said second time interval if said negative resistance means was not switched from one to the other of its two stable states by said first signal means during said first time interval.

7. In combination in a logic circuit, voltage-controlled negative resistance diode means, two asymmetrically-conducting diodes respectively connected between a point of reference potential and the electrodes of said diode means, clock source means for biasing only one of said asymmetrically-conducting diodes in its relatively low impedance state during a first time interval, for biasing said negative resistance diode means in a relatively low voltage condition for bistable operation during the first time interval, for biasing only the other one of said asymmetrically-conducting diodes in its relatively low impedance state during a second time interval and for biasing said negative resistance diode means for bistable operation during the second time interval, and signal means connected to said diode means for controlling the stable condition thereof.

8. In combination in a logic circuit, a tunnel diode, means for clamping one terminal of said diode at a reference potential during a first time interval, for biasing said diode for bistable operation during said first time interval, for clamping the other terminal of said diode at said reference potential during a second time interval and for biasing said diode for bistable operation during said second interval.

9. A combination as in claim 8 wherein said means includes two asymmetrically-conducting diodes respectively connected to said terminals.

10. A combination as in claim 9 further including signal means connected to said tunnel diode for controlling the stable condition thereof.

11. A combination as in claim 10 wherein said signal means includes a switching signal source and an inhibiting signal source each connected to the other terminal of said diode.

12. A combination as in claim 10 wherein said signal means includes at least two switching signal sources respectively connected to said terminals.

References Cited in the file of this patent

UNITED STATES PATENTS 2,944,164 Odell et al. ............... July 5, 1960